United States Patent [19]

Saito et al.

[11] 3,947,891

[45] Mar. 30, 1976

[54] STATIC MAGNETIC ERASING HEAD

[75] Inventors: Makoto Saito, Omiya; Kengo Matsumoto; Kiyonori Hayakawa, both of Tokyo, all of Japan

[73] Assignee: Sony Corporation, Tokyo, Japan

[22] Filed: Sept. 27, 1974

[21] Appl. No.: 509,947

[30] Foreign Application Priority Data
Oct. 2, 1973 Japan............................. 48-110866
Oct. 2, 1973 Japan..................... 48-115041[U]

[52] U.S. Cl. ............................................. 360/118
[51] Int. Cl.² ...................... G11B 5/12; G11B 5/27
[58] Field of Search............................ 360/118, 66

[56] References Cited
UNITED STATES PATENTS

| 2,546,927 | 3/1951 | Howell | 360/118 |
|---|---|---|---|
| 2,594,934 | 4/1952 | Kornei | 360/118 |
| 2,784,259 | 3/1957 | Camras | 360/118 |
| 2,908,768 | 10/1959 | Steinegger | 360/118 |
| 3,772,471 | 11/1973 | Imai et al. | 360/118 |

Primary Examiner—Robert S. Tupper
Attorney, Agent, or Firm—Hill, Gross, Simpson, Van Santen, Steadman, Chiara & Simpson

[57] ABSTRACT

The present invention relates to an erasing head for a magnetic recording apparatus using a static magnetic field. The erasing head consists of a plurality of magnetic poles having surfaces which confront the recording tape. The first and second poles have polarities opposite to each other. The first pole is arranged to engage a recording track along its full width and magnetizes it to a given polarity. The second pole is arranged to engage the upper half of the track and magnetize it to the opposite polarity. Each half track is magnetized to opposite polarities so that the distortion of output signals is reduced, when the signal is reproduced by a reproducing head engaging both half tracks.

8 Claims, 43 Drawing Figures

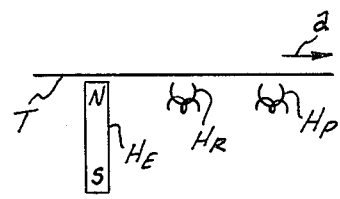
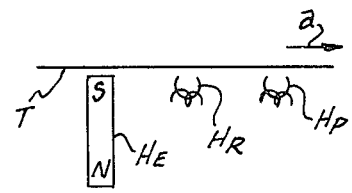
Fig. 1
Fig. 2
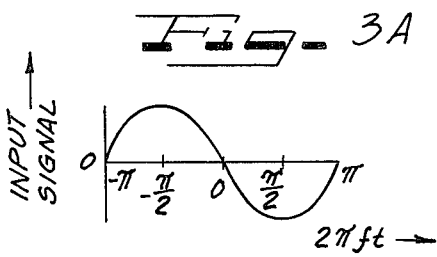
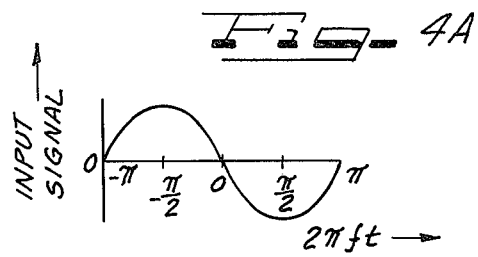
Fig. 3A
Fig. 4A
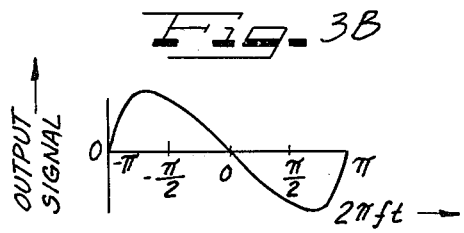
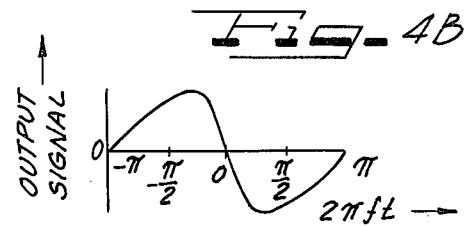
Fig. 3B
Fig. 4B
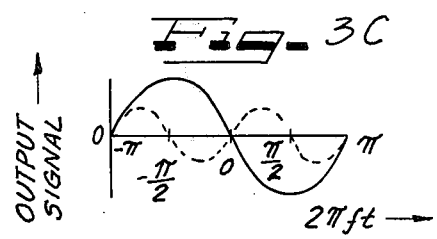
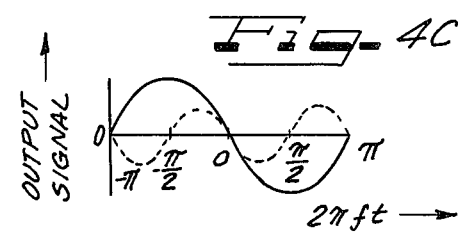
Fig. 3C
Fig. 4C
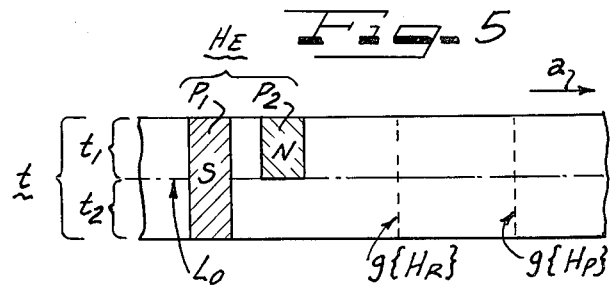
Fig. 5

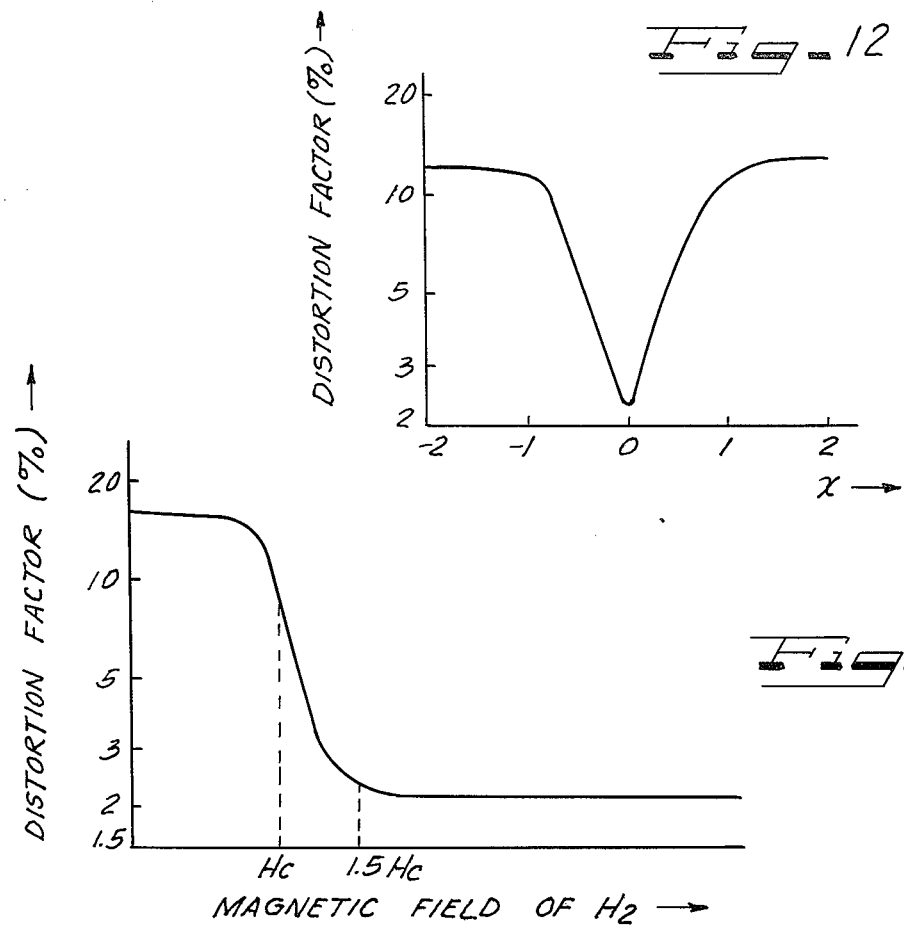
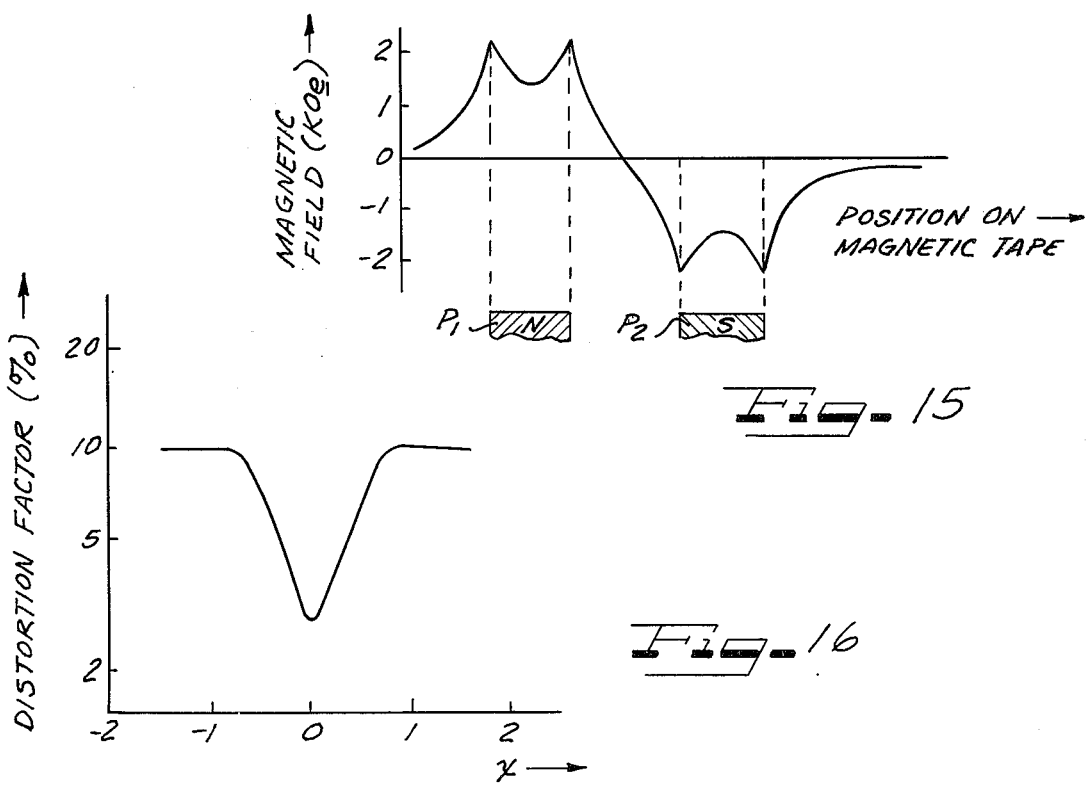

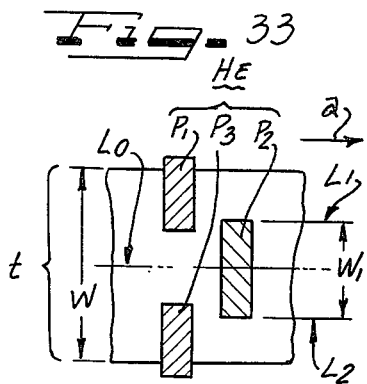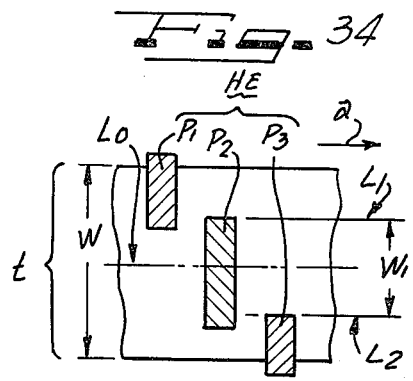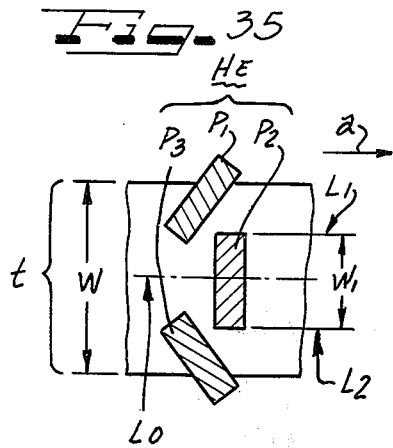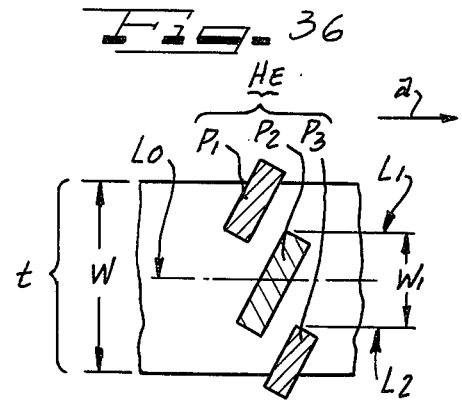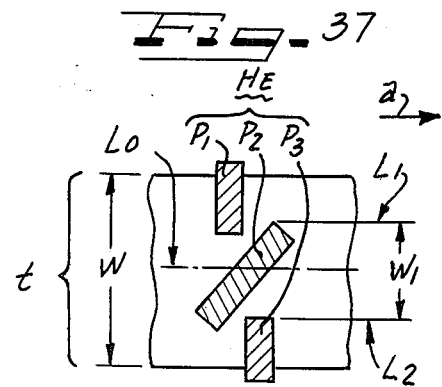

STATIC MAGNETIC ERASING HEAD

BACKGROUND OF THE INVENTION

Field of the Invention

The present invention relates to a magnetic erasing head employing a static magnetic field and being suitable for use in a magnetic recording apparatus to erase signals so that a new magnetic record may be made thereon. The invention particularly involves the disposition of means for creating static magnetic fields of different polarity with relation to the width of the tape.

DESCRIPTION OF THE PRIOR ART

There are two types of methods for erasing residual magnetization of a magnetic recording medium, such as a magnetic recording tape. One involves alternating current demagnetization, and the other involves the use of a static magnet. The alternating current demagnetization is one involving flow of an alternating current through a coil wound on the magnetic erasing head. As the magnetic medium passes the magnetic gap of the erasing head, it is magnetized up to its magnetic saturated condition. As it leaves the gap, it is remagnetized in the reverse direction, and the process is repeated over and over again. The magnitude of magnetization gradually becomes small and at last reaches a neutral or zero point where the residual magnetization becomes zero. This method is widely used in the field of magnetic recording and reproducing apparatus and is effective in completely erasing residual magnetization. However, it is not particularly desirable in connection with the use of magnetic materials having high coercive force in which case the electric power consumed for the erasing head becomes high. Such a high power loss causes the core of the erasing head to be easily saturated as a result of which the erasing effect is decreased.

The second method, involving static magnetic erasing, employs a strong static magnetic field provided by a permanent magnet or a magnetic core having a coil thereon, the field being directed toward the magnetic recording medium. The medium is magnetized from a state of residual magnetization to the saturated state. This method is used for relatively small magnetic recording and reproducing apparatus such as a tape recorder operated by a battery because of its simplicity. The difficulty of the second method is that it tends to distort the output signal at the reproducing step when the apparatus is used.

There have been suggestions of improving the static magnetic erasing method in the prior art. It has been suggested to use a permanent magnet in which the magnetized polarity is reversed repeatedly so that the magnitude decreases towards zero along the scanning direction of the magnetic tape. This improved erasing head has an advantage similar to the alternating current method, but has the disadvantage that it requires a large number of magnetic poles which causes the length of the head to be long. Accordingly, the improved erase head is not available for a small magnetic recording apparatus.

SUMMARY OF THE INVENTION

In accordance with the present invention, there is provided a magnetic erasing head which comprises at least two magnetic poles which are arranged sequentially to scan the recording track and provide static magnetic fields to be track. The first pole faces the recording track to its full width and provides a static magnetic field sufficient to saturate the residual magnetization of the magnetic recording medium to one polarity. The second pole provides a static magnetic field stronger than the maximum coercive force of the various magnetic recording media which may come in contact with the head, and magnetizes the same to a second polarity opposite to the first-mentioned polarity. The magnetic poles are disposed so that the distortion of output signals caused by the track shift along a direction perpendicular to the track scanning direction and by the variety of coercive forces of magnetic media is reduced.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIGS. 1 and 2 are illustrated rather schematically and are illustrations of the disposition of magnetic heads to explain the principles of the present invention;

FIGS. 3A, 3B, 3C and 4A, 4B, 4C are the signal wave shapes used in the explanation;

FIG. 5 is an illustration of the disposition of magnetic poles included in the erase head of the present invention;

FIGS. 12 and 13 are diagrams illustrating the experimental results obtained from a system of the type shown in FIG. 11;

FIGS. 15 and 16 are diagrams of the results of tests made on the head of FIG. 14;

FIGS. 33 to 37 show other embodiments of the erasing head of the present invention.

DESCRIPTION OF THE PREFERRED EMBODIMENTS

Figure 6:
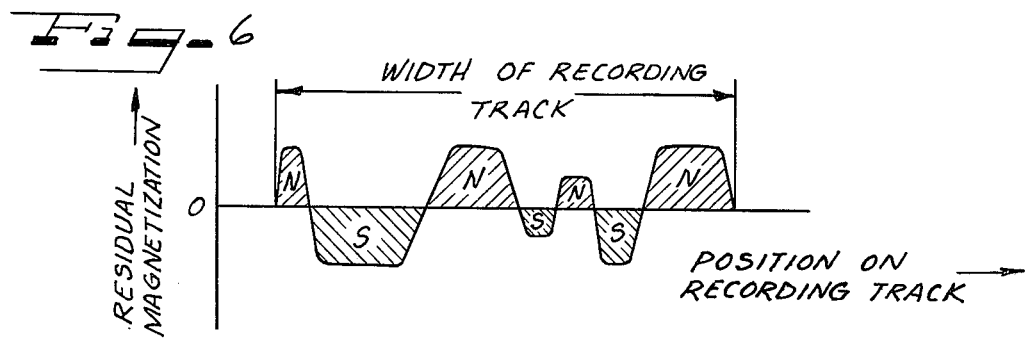
FIG. 6 is another diagram used to explain the principles of the present invention.

The principles of static erasing can be explained by dividing the erase head into two portions. One of these portions, called the first portion, is that in which the recording tape is partially magnetized to a first polarity, for example, to a north pole. The other portion is that in which the recording tape is partially magnetized to a second polarity, for example, a south pole. The function of the first portion of the erasing head is explained in FIGS. 1 and 3, and that of the second portion in FIGS. 2 and 4.

Regarding the first portion, shown in FIG. 1, three heads are arranged in the order of erasing head $H_E$, a recording head $H_R$ and the playback or reproducing head $H_P$, from left to right, respectively. These three heads are arranged to engage a magnetic recording tape T. The erasing head $H_E$ is shown in a simple manner such as a bar magnet with its north pole facing the tape.

FIG. 2 is similar except that the erase head $H_E$ has a south pole facing the tape. In both FIGS. 1 and 2, the two magnetic poles of the erasing head $H_E$ provides sufficient magnitude of magnetic field to saturate the residual magnetization of the recording tape.

The magnetic tape T is scanned along the direction indicated by the arrow a and first passes by the erasing head $H_E$ then the recording head $H_R$ and finally across the reproducing head $H_P$. Assume that a sine wave signal, illustrated in FIGS. 3A and 4A is applied to the recording head $H_R$ of FIGS. 1 and 2 to record a signal on the magnetic recording medium. Subsequently, the recorded signal is reproduced by the reproducing head $H_P$ of FIGS. 1 and 2, respectively. If the output signals are observed, they have distortions which appear different from each other, as illustrated in FIGS. 3B and 4B.

We have found that the distorted output signal is caused by a superposition of sine waves, that is, the first wave having the same frequency as the input signal and illustrated by a solid line in FIGS. 3C and 4C, and a second wave corresponding to the second harmonic, illustrated by a dotted line in FIGS. 3C and 4C. The phase difference between the second harmonic waves is 180°. Consequently, the output signals illustrated in FIGS. 3B and 4B are distorted and the distortions are different from each other.

In the present invention, the two portions of the erasing head $H_E$ shown in FIGS. 1 and 2 are formed in a common erasing head or in some manner adjacent to each other and facing to the same recording track. The recording head $H_R$ and the reproducing head $H_P$ are arranged to engage the full width of the track. In the reproducing head, both output signals shown in FIGS. 3B and 4B are superposed and both second harmonic waves shown by the dotted lines cancel each other. As a result, an output signal without distortion is obtained.

The first embodiment of the invention is illustrated in FIG. 5 where an erase head $H_E$ a recording head $H_R$, a reproducing head $H_P$, and a recording tape having a recording track $t$ are illustrated in a simplified manner. The recording head $H_R$ and the reproducing head $H_P$ are shown only with dotted lines of their head gaps $g$, respectively. The recording track $t$ is bisected into two semi-tracks $t_1$ and $t_2$ by a centerline $L_O$. The magnetic erasing head $H_E$ includes two poles having different polarities and positions with respect to each other. These polarities and positions are important to the present invention. The first pole $P_1$ is arranged and positioned to face or contact over the whole width of the recording track $t$, and has a polarity, for example, of a south pole. The pole $P_1$ provides a sufficiently strong magnetic field to saturate the recording tape. The second pole $P_2$ is arranged to contact one of the bisected semi-tracks, for example, track $t_1$ and has the polarity of a north pole. The second pole $P_2$ provides a stronger magnetic field than the coercive force of the recording tape which is determined by the magnetic material used in the tape. The two poles of the erasing head $H_E$ are arranged with a small distance between them along the direction of the recording track $t$ in the scanning direction of the recording tape which is shown by an arrow a. The first step is the magnetization which saturates the recording track $t$ by the pole $P_1$ over the entire width. The second step is the reverse magnetization of the bisected recording track $t_1$ by the second pole $P_2$. According to this erasing process, the reproducing signal obtained by the head $H_P$ has little distortion by virtue of the cancellation of the secondary high frequency signals with their 180° phase difference.

In the above-described embodiment, the track $t$ is bisected, however, the principle can be generalized as follows. When the width of the recording track $t$ is divided into $n$ (an integral number more than 2) parts, and the polarity of the residual magnetization of each of the divided tracks is south, north, south, FIG. 6 shows the amount of residual magnetization versus the position of the recording track along the direction perpendicular to the scanning direction in which the magnetization is produced by a plurality of magnetic poles of the erasing head. For the erasure to occur without distortion, it is necessary that the amount of divided tracks magnetized to the first polarity, i.e., to the south pole is substantially equal to that of the other divided tracks magnetized to the north pole. If the maximum values of the ordinates of each divided track are substantially equal to each other, the amount of residual magnetization can approximate the total widths of the divided tracks. In other words, the sum of the widths of the divided tracks which is magnetized to the first polarity is equal to that of the second divided tracks which is magnetized to the second polarity. Accordingly, the distortion of the reproduced output signals can be minimized.

The relation between the distortion of the reproducing signal and the effective width, W, $W_1$, and $W_2$ of the recording track $t$ and the divided tracks $t_1$ and $t_2$ illustrated in connection with FIG. 7. In that figure, W is the effective width of the recording track $t$, $W_1$ is the effective width of the first semi-track $t_1$, and $W_2$ is the effective width of the second divided semi-track $t_2$. The recording tape with its track $t$ is scanned from the left to the right as shown in that figure.

After the saturation of the recording track $t$ by the north pole or south pole of the erasing head $H_E$ as explained in FIGS. 1 to 4, a sine wave signal M sin $\Omega t$ is applied and recorded on the track by the recording head $H_R$ with its head gap $g$, M being a constant, $\Omega$ being the angular velocity and $t$ being the time. Reproduced output signals $e_N$ and $e_S$ can be represented as follows:

$$e_N = E_1 \sin \Omega t + E_2 \sin 2\Omega t \quad (1)$$

$$e_S = E_1 \sin \Omega t + E_2 \sin 2\Omega t \quad (2)$$

In the above equations, $E_1$ and $E_2$ are constants. Accordingly, the total reproduced signal $e$ of the recording track $t$, as shown in FIG. 7 is given by equation (3)

$$e = \frac{W_1}{W} \cdot e_N + \frac{W_2}{W} \cdot e_S$$

$$= E_1 \sin \omega t + \frac{W_1 - W_2}{W}$$

$$E_2 \sin 2\Omega t \quad (3)$$

If we define $E_2'$ as equal to $$\frac{W_1 - W_2}{W}.$$

$E_2$ and $x$ as equal to $$W_1 - \frac{W}{2},$$

this equation can be written as follows:

$$E_2' = \frac{x}{W/2} \cdot E_2 \quad (4)$$

Figure 7:
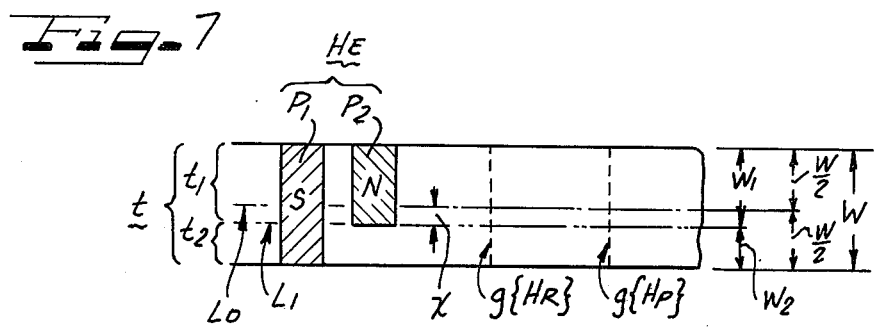
FIG. 7 is an illustration of the disposition of magnetic poles and magnetic heads which can be used in the present invention.

As indicated in FIG. 7, $x$ represents the shift of the borderline L which marks off the different polarities of the residual magnetization by the magnetic erasing head $H_E$ from the bisecting line $L_0$ of the recording track $t$. Therefore, the distortion factor (D) of the reproducing signal is expressed by the equation (5)

$$D = \frac{|E_2'|}{\sqrt{E_1^2 + E_2'^2}} = \frac{1}{\sqrt{1 + \left(\frac{W/2}{x} \cdot \frac{E_1}{E_2}\right)^2}} \quad (5)$$

Figure 8:
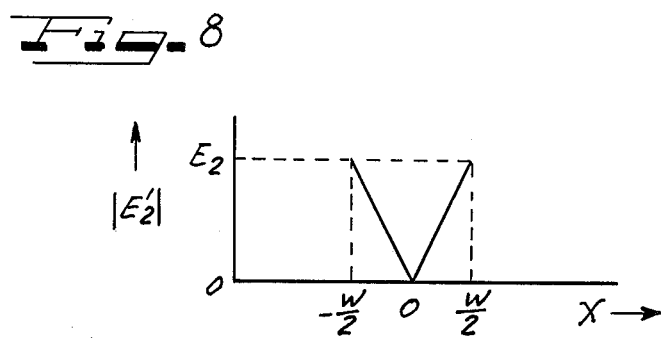
FIGS. 8, 9 and 10 are additional diagrams explaining the present invention.
Figure 9:
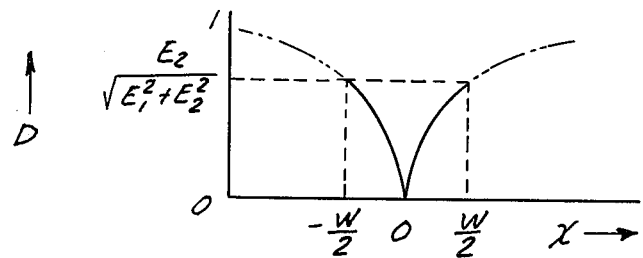

These equations are plotted in FIGS. 8 and 9, respectively. In practice, the absolute value of $$\left|\frac{W/2}{x}\right|$$

is equal to or greater than 1, and $E_1$ is much greater than $E_2$, the distortion factor D can be written by the following equation as an approximation:

$$D = \left|\frac{x}{W/2} \cdot E_2\right| = |E_2'| \quad (6)$$

Therefore, when the maximum permitted distortion factor is $D_a'$ and $x = x_a$ at $D = D_a$, $x_a$ can be written by equation (7):

$$|x_a| = \frac{W}{2} \cdot \frac{D_a}{E_2} \quad (7)$$

Figure 10:
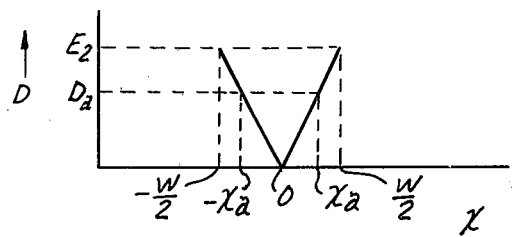

Equation (7) is plotted in FIG. 10. This figure indicates the permitted range of shift of the borderline L from the bisecting line $L_0$.

Figure 11:
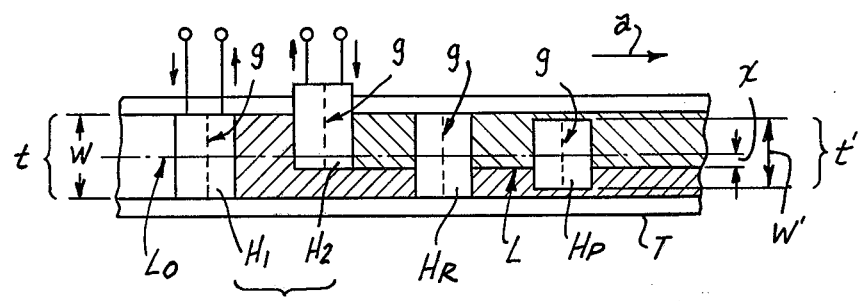
FIG. 11 is an illustration of the manner of disposing the magnetic heads in a preferred embodiment of the invention.

Secondly, the effect of the position of the erasing head along the width of the recording track, perpendicular to the scanning direction of the tape, and the intensity or magnitude of the magnetic field of the erasing head, on the distortion of the reproducing signal was determined on the basis of an experiment with two separate erasing heads having opposite polarity from each other. FIG. 11 shows the positioning of the magnetic heads against the magnetic tape for this experiment. The magnetic tape T was engaged by the magnetic heads $H_1$, $H_2$, the magnetic recording head $H_R$, and the magnetic reproducing head $H_P$ in that order. The tape T was scanned in the direction of the arrow $a$. The magnetic erasing head $H_E$ comprised the magnetic heads $H_1$ and $H_2$. Both heads included coils through which direct current flowed in directions opposite to each other so that the magnetic flux from the erasing heads had opposite directions. The letter $g$ indicates the gaps of the magnetic heads $H_1$, $H_2$, $H_R$ and $H_P$, respectively, extending at right angles to the tape scanning direction.

The frequency of the recording bias current was 34 kilohertz with a bias point that had a peak at 1 kilohertz, the recording signal was a single frequency signal of 333 hertz in the form of a sine wave whose level was 11db lower than the saturation magnetization level. The coercive force of the magnetic tape T was 1036 oersteds, its magnetic layer thickness was 3.35 microns and the scanning speed was 4.8 centimeters per second. As shown in FIG. 11, the magnetic head $H_1$ and the magnetic recording head $H_R$ were arranged with respect to the recording track $t$ having a width W so that each of the gaps $g$ covered the whole width of the recording track $t$. The magnetic head $H_2$ engaged a part of the recording track $t$ and had a portion extending beyond the width of the track, as shown. The distance from the centerline $L_0$ of the recording track to the bottom end of the gap $g$ is designated $x$. The magnetic reproducing head $H_P$ was arranged to engage the magnetic tape T so that the center of the gap $g$ of the reproducing head $H_P$ coincides with the centerline $L_0$ of the recording track $t$.

In the first experiment, a direct current strong enough to saturate the magnetic tape T was passed through both coils of the magnetic heads $H_1$ and $H_2$. While varying the value of $x$, the distortion factor of the reproduced signal was measured. The results are shown on the diagram of FIG. 12 in which the ordinates represent the distortion factor in percent, and the abscissa refers to the distance $x$ in millimeters. From FIG. 12 it will be seen that the distortion factor is at a minimum where $x$ is equal to zero, i.e., where the bottom end of the gap of the magnetic head $H_2$ coincides with the centerline $L_0$ of the track $t$ in FIG. 11.

In the second experiment, a DC current which was strong enough to saturate the magnetic tape T was passed only to the magnetic head $H_1$. The magnetic head $H_2$ was fixed at a position where $x$ was equal to O, and the direct current flow to the magnetic head $H_2$ was varied to vary the strength of the magnetic field $H_2$ against the magnetic tape T, while the distortion factor of the reproducing signal was measured. The results from this experiment are shown in the diagram of FIG. 13, where the ordinate represents the distortion factor in percent, and the abscissa represents the strength of the magnetic field of the magnetic head $H_2$ against the magnetic tape T. $H_C$ is the coercive force of the magnetic tape T. From the diagram of FIG. 13, it will be seen that the distortion factor rapidly decreases above the point where the strength of the magnetic field of the magnetic head $H_2$ against the magnetic tape T is more than the coercive force $H_C$ of this magnetic tape, and is almost constant at the point where the strength of the magnetic field of the magnetic head $H_2$ is more than 1.5 times the coercive force $H_C$ of the recording tape T.

The general arrangement of the erasing head of the present invention is as follows. The first and second magnetic poles which are parts of the magnetic erasing head are arranged on the same track of the magnetic recording medium. The first magnetic pole has the same or longer length to a direction perpendicular to the scanning direction of the track than the width of the recording track, and enough intensity of magnetic field to saturate the magnetic recording medium. The second magnetic pole is less in length in a direction perpendicular to the scanning direction of the track than the width of the recording track, and it has more intensity produced by its static magnetic field that the coercive force of the magnetic recording medium, and preferably stronger than 1.5 times the coercive force. The components of the static magnetic field produced by these heads along the scanning direction of the track have directions opposite to each other but preferably have absolute values which are equal to each other.

Figure 14:
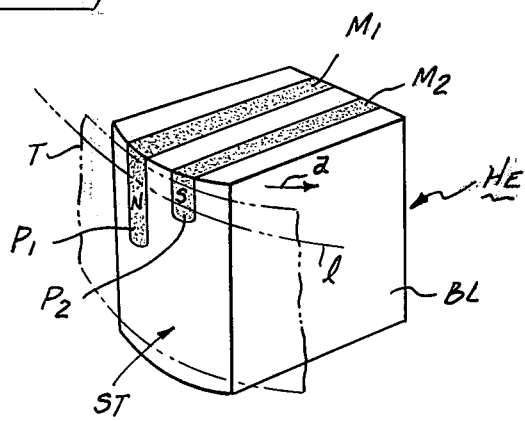
FIG. 14 is a perspective view of one erasing head of the present invention.

FIG. 14 illustrates one specific embodiment of the present invention as explained in FIG. 5. The magnetic erasing head $H_E$ which can be used in a two-track type cassette tape recorder comprises first and second bar magnets $M_1$ and $M_2$ embedded in a common head block BL of non-magnetic material such as brass.

The erasing head $H_E$ has a cylindrical surface ST which faces the magnetic recording tape T and in which are located the ridges of first and second magnetic poles $P_1$ and $P_2$ of bar magnets $M_1$ and $M_2$. The first and second bar magnets $M_1$ and $M_2$ are polarized such that poles $P_1$ and $P_2$ have opposite polarity. The first and second magnetic poles $P_1$ and $P_2$ have rectangular faces with their long sides at right angles to the tape scanning direction. The shape of the magnet, of course, is not critical to the purposes of the present invention.

The first magnetic pole $P_1$ is longer in the direction at right angles to the tape scanning direction than the width of the recording track so that it overlaps the upper recording track. The excess length of the magnetic pole $P_1$ may extend out from the upper edge of the recording track, but should not extend downwardly into another recording track.

The second magnetic pole $P_2$ has a length in the direction at right angles to the tape scanning direction greater than the width of the bisected width of the recording track so that it can engage the upper portion of the bisected track as explained in FIG. 5. The edge of the second magnetic pole $P_2$ may extend beyond the upper edge of the recording track, but must not extend into the bisected lower recording track.

The magnetic tape T first passes across the magnetic pole $P_1$ and then on to the magnetic pole $P_2$, scanning in the direction of arrow $a$. The magnetic field distribution of this magnetic erasing head $H_E$ is shown in FIG. 15. The component of the magnetic flux density in the thickness direction of the magnetic tape T is plotted against the position along a line 1 shown in FIG. 14 along the scanning direction. The line 1 is selected so that it engages both poles. When the magnetic erasing head $H_E$ is at a direction at right angles to the scanning direction of the magnetic track, the distortion factor in percent of the reproduced signal is measured, with the result being shown in FIG. 16. This figure is similar to that of FIG. 12 and shows that where $x = 0$, i.e., where the lower edge of the second magnetic pole $P_2$ is on the centerline of the recording track, minimum distortion is observed. The magnetic recording head $H_R$ and the magnetic reproducing head $H_P$ used in this experiment had gap widths of 1.4 microns and 1.5 millimeters, respectively. The frequency of the recording bias current was 34 kilohertz with a bias point having a peak of 1 kilohertz. The recording signal was a single frequency signal of 333 hertz in the form of a sine wave, which level was 11db lower than the saturation magnetization level. The coercive force of the tape was 974 oersteds and its magnetic layer thickness was 1.89 microns. The scanning speed was 4.8 centimeters per second.

Figure 17:
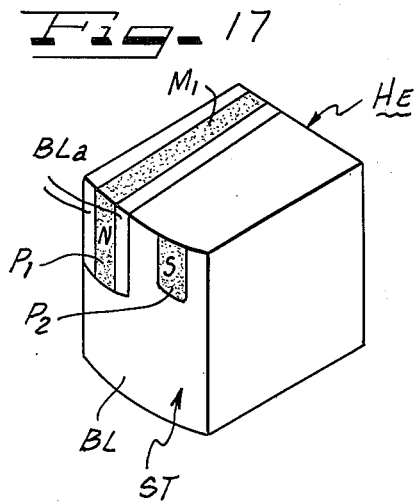
FIGS. 17, 18 and 19 are perspective views of various modified forms of the present invention.
Figure 18:
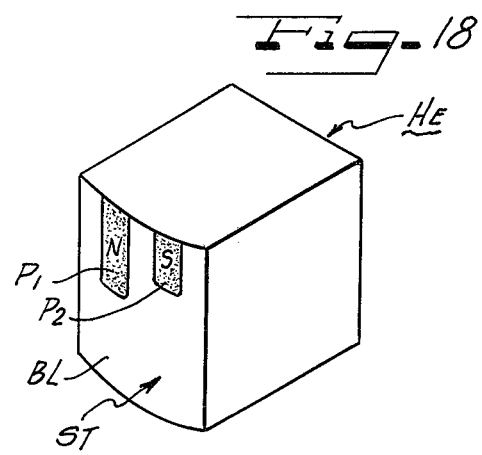
Figure 19:
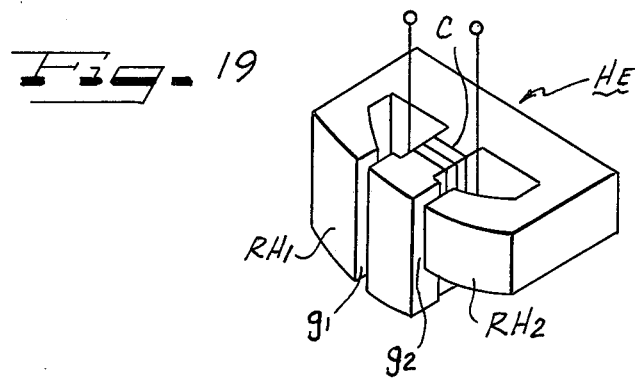

Several specific examples are also illustrated in FIGS. 17 to 19. The magnetic erasing head $H_E$ of FIG. 17 includes a first magnetic pole $P_1$ and a second magnetic pole $P_2$ embedded in a head block BL which is formed predominantly of magnetic material and a non-magnetic part $BL_a$. The first pole $P_1$ is a bar-type magnet and the second pole $P_2$ is a magnetic pole which is selectively magnetized at the cylindrical surface ST of the magnetic material. The opposite N-pole is embedded in the block and is not shown in the drawings. The position and magnitude of both poles are arranged to be as described in connection with the previous examples shown in FIGS. 5, 11 and 14.

A further example of the present invention is shown in FIG. 18. This structure includes a head block BL consisting of magnetic material. Both poles, poles $P_1$ and $P_2$ are formed by selective magnetization against a cylindrical surface ST of the head block BL of magnetic material. Opposite poles for each of the poles are embedded in the block and are not shown in the drawings. This example is considered to be the simplest structure employing the principles of the present invention and is suitable for small recording apparatus.

A further example is shown in FIG. 19. Here, the magnetic erasing head $H_E$ consists of a magnetic ring core common to two heads $RH_1$, $RH_2$, and the coil C which is wound on the center leg of the core. The gaps $g_1$, $g_2$ extend at right angles to the scanning direction of the tape. The heads $RH_1$, and $RH_2$ can be considered as corresponding to the heads $H_1$ and $H_2$ of FIG. 11. The two head gaps $g_1$ and $g_2$ of FIG. 19 may be considered the same as the first and second poles of FIG. 5. Thus, the principles of the present invention include the use of a head gap formed of a ring core which produces magnetic flux in opposite directions.

Figure 20:
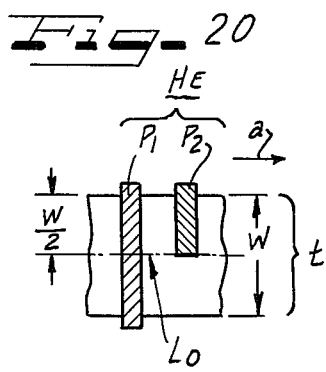
FIG. 20 is an illustration of the disposition of magnetic poles included in the erasing head of the present invention.
Figure 21:
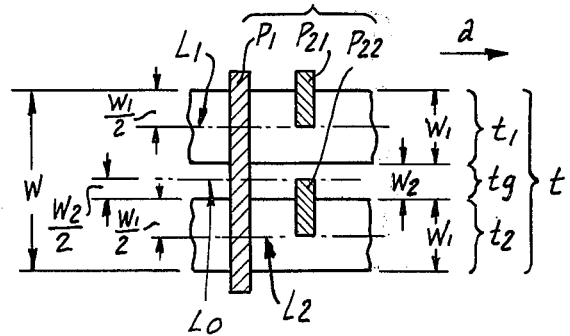
FIGS. 21 and 22 illustrate the dispositions of magnetic poles included in the erase head of the present invention for a double track.

The combination of a permanent magnet with an electromagnet can also be used in accordance with the present invention. In the erasing head $H_E$ mentioned in conjunction with FIGS. 14, 17, 18 and 19, the length of the first magnetic pole $P_1$ is longer than the width W of the magnetic recording track $t$ as shown in FIG. 20. The length of the second magnetic pole $P_2$ is longer than the width W/2 divided by two of the magnetic recording track $t$. A second embodiment of pole arrangement is shown in FIG. 21 where the recording track $t$ is used both as a single track and as a double track. As shown in FIG. 21, when the recording track $t$ is used as a single track, the whole track width W is used, and when used as a double track, the recording track $t$ is divided into tracks $t_1$, track $t_2$ and guard band $t_g$ having widths of $W_1$, $W_1$, and $W_2$, respectively. In this case, the magnetic erasing head $H_E$ comprises the first magnetic pole $P_1$ which covers the recording track $t$ over the whole width W while the second magnetic poles $P_{21}$ and $P_{22}$ cover half widths of the tracks $t_1$ and $t_2$, respectively. The total effective length of poles $P_{21}$ and $P_{22}$ on the recording track as approximately $W_1+W_2/2$. This erasing head can be considered as the combined head of two erasing heads of FIG. 20, with the residual magnetization on the recording track $t$ being divided into four portions having alternating polarities. The total residual magnetization of one polarity is equal to that of the other and as a result, the distortion factor is low.

Figure 22:
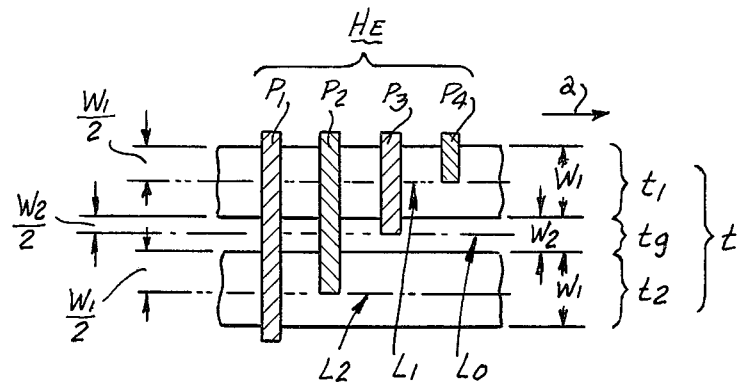

A third embodiment of magnetic pole arrangement for a magnetic erasing head is shown in FIG. 22, wherein the recording track $t$ is also used both as a single and as a double track. A first pole $P_1$ is disposed in the same manner as in FIG. 21. A second pole piece $P_2$ is disposed so that it covers the track $t_1$ along its full width and also covers ½ of the track $t_2$. Third and fourth poles $P_3$ and $P_4$ are arranged in the manner of the poles shown in FIG. 20. This type of arrangement, however, may lead to increased distortion of the reproduced signal.

Figure 23:
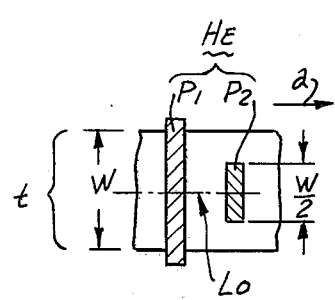
FIGS. 23, 24 and 26 are illustrations of modified dispositions of the magnetic poles of the present invention.

The embodiments of the invention which resolve this problem are shown in FIGS. 23 and following. The magnetic erasing head $H_E$ of FIG. 23 includes a first magnetic pole piece $P_1$ which has a length along the direction perpendicular to the tape scanning direction greater than the width W of track $t$. A second magnetic pole $P_2$ has a length just a half width of the recording track, that is, W/2. The center points of the first and second poles are on the centerline $L_0$ of the recording track $t$. In the case of using this magnetic erasing head, the absolute value of the total residual magnetization of N polarity of the erased track is equal to that of S polarity, regardless of any shift of the recording track along its width. As a result, the distortion of the reproduced signal is close to zero.

Figure 24:
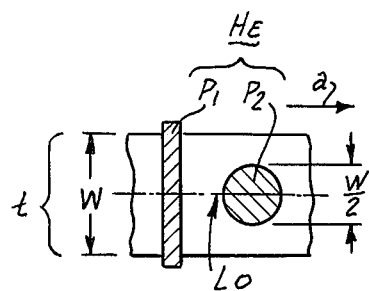

In the magnetic erasing head $H_E$ of FIG. 24, the second magnetic pole $P_2$ is circular in cross-section with a diameter of W/2. This head $H_E$ has the advantage that it can be formed from a wire-type magentic material of very fine size.

Figure 25:
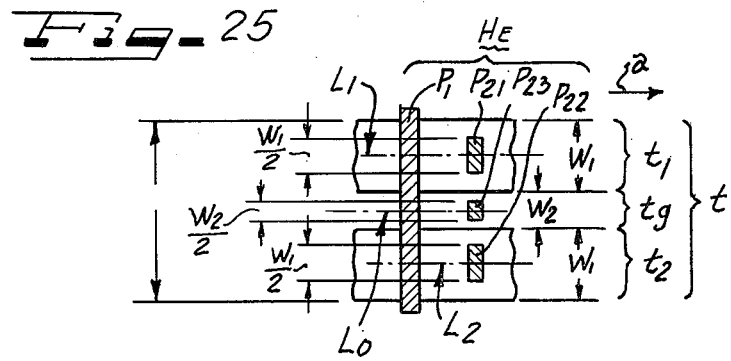
FIG. 25 is an illustration of a modified disposition of magnetic poles for a double track.

In FIG. 25 there is shown an erasing head $H_E$ which uses both single and double tracks. A first magnetic pole $P_1$ of a first polarity is arranged to engage the entire width of the recording track $t$. Second magnetic poles $P_{21}$, $P_{22}$ and $P_{23}$ have their center points arranged on the centerlines $L_1$, $L_2$ and $L_0$ of the tracks $t_1$, $t_2$ — and the guard band $t_g$, respectively. These poles are of opposite polarity from pole $P_1$. The lengths of the second poles along the width direction are $W_1/2$, $W_1/2$, and $W_2/2$, respectively, so that the absolute values of the residual magnetization of erased tracks of north and south polarity are approximately equal.

Figure 26:
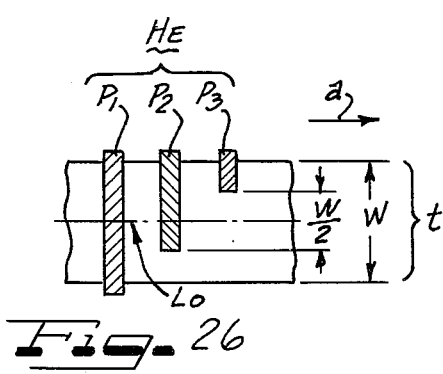

The magnetic erasing head $H_E$ shown in FIG. 26 has the same function as the magnetic erasing head of FIG. 23. The head $H_E$ includes a first magnetic pole $P_1$ which engages the track $t$ over its entire width, a second magnetic pole $P_2$ and a third magnetic pole piece $P_3$. The second magnetic pole piece $P_2$ has a polarity opposite to that of $P_1$ and a length which is effectively W/2 longer than that of the third magnetic pole $P_3$ along the direction at right angles to the scanning direction of the recording track $t$. The third magnetic pole $P_3$ has a polarity the same as that of the first magnetic pole $P_1$ and a length which is shorter than W/2.

Figure 27:
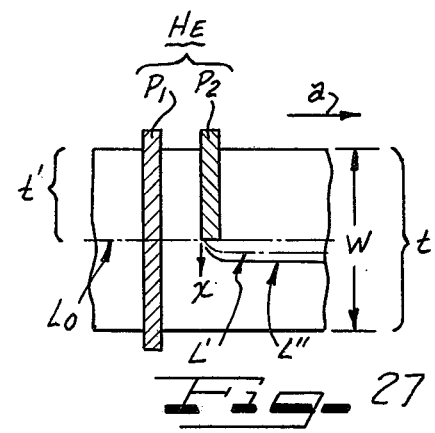
FIG. 27 is an illustration explaining the positions of the magnetic poles.
Figure 28A:
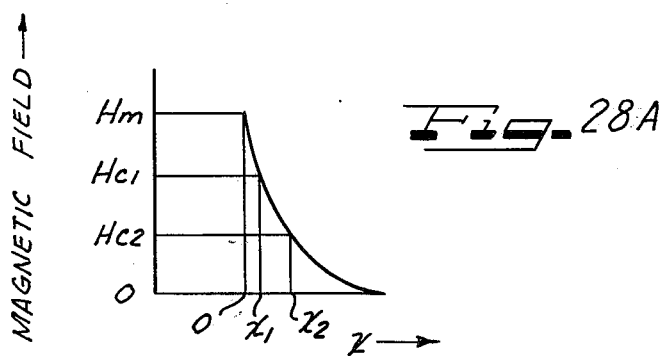
FIGS. 28A, 28B and 28C are diagrams explaining the magnetic characteristics.

In the previous embodiments, we have assumed that the boundary between the areas of magnetized polarity is the locus of the bottom end of the second magnetic pole, but, in practice, this boundary may be shifted downward as shown in FIG. 27 according to the correlation between the magnitude of the magnetic field of the magnetic pole $P_2$ and the coercive force of the magnetic tape. In a diagram of FIG. 28A, the magnitude of the magnetic field of the magnetic pole $P_2$ perpendicular to the scanning direction is plotted. $H_m$ is the maximum value of the magnetic field of the magnetic pole $P_2$ which value must be greater than the coercive force of the magnetic tape. The magnitude of the magnetic field of the magnetic pole piece $P_2$ decreases with the increment of $x$ which is the distance downwardly from the bottom end of the magnetic pole $P_2$. When the maximum value $H_m$ of the magnetic field of the pole $P_2$ is a little more than the coercive force of the magnetic tape, the boundary between the areas of both polarities of the recording track nearly coincides with the locus of the bottom end of the magnetic pole $P_2$. However, if the maximum value $H_m$ is sufficiently larger than the coercive force of the magnetic tape, the shift of the boundary downward from the centerline $L_0$ of the magnetic recording track increases according to the value of $H_m$.

Figure 28B:
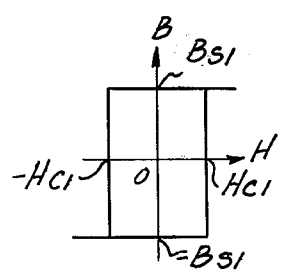
Figure 28C:
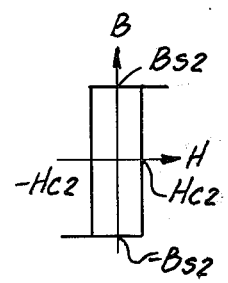

When the width W of the recording track is small, the second pole $P_2$ must be arranged so that its boundary is close to the centerline $L_0$ of the track by disposing it a little higher than the centerline $L_0$. If the magnetic tapes have hysteresis characteristics of substantially square shape as shown in FIGS. 28B and 28C and the coercive force values are $H_{C1}$ and $H_{C2}$, $H_{C1}$ being larger than $H_{C2}$, the boundaries between the areas of both polarities of the recording track are L' and L'' in FIG. 27, and $x_1$ and $x_2$ in FIG. 28A. The positions of the boundaries L' and L'' also shift according to the maximum magnetic field $H_m$.

The effect of the coercive force of the magnetic tape on the distortion of the reproduced signal can be explained as follows. From the diagram of FIG. 28A, it will be seen that the gradient of the magnetic field near the point where $x = 0$ of the magnetic pole $P_2$ is more abrupt than that of points removed from that end. Therefore, in order to decrease distortions in a polarity of different magnetic tapes having various coercive forces, the value of the maximum magnetic field $H_m$ of the magnetic pole $P_2$ is selected to be slighty larger than the highest value of maximum coercive force used among these magnetic tapes. This theory can also be applied in the magnetic erasing head $H_E$ of FIGS. 23 or 24.

Figure 29:
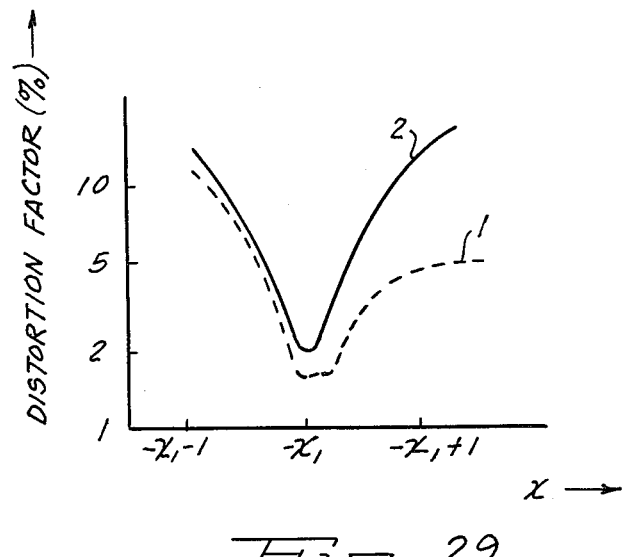
FIG. 29 is a diagram of the results obtained with the type of assembly shown in FIG. 27.

As shown in the diagram of FIG. 29, the distortion factor of the reproduced signal was measured, varying $x$ which is the distance in millimeters between the boundary L' and the bottom end of the magnetic pole $P_2$. The coercive forces of the magnetic tapes were 960 oersteds and 470 oersteds, respectively. The magnetic field on the track produced by magnetic pole $P_1$ was 2700 oersteds and that produced by magnetic pole $P_2$ was 1050 oersteds, corresponding to $H_m$ in FIG. 28A. The full line 2 in FIG. 29 illustrates the characteristics of the tape having a coercive force of 960 oersteds, and the dotted line 1 shows the characteristics of the tape having a coercive force of 470 oersteds. The position $-x_1$ on the abscissa indicates the position of the end of the magnetic pole $P_2$, where the boundary $L'$ of the first magnetic tape coincides with the centerline $L_0$. It will be seen from FIG. 29 that the shift of $x$ representing the minimum distortion was negligibly dependent upon the coercive force of the tapae.

Figure 30:
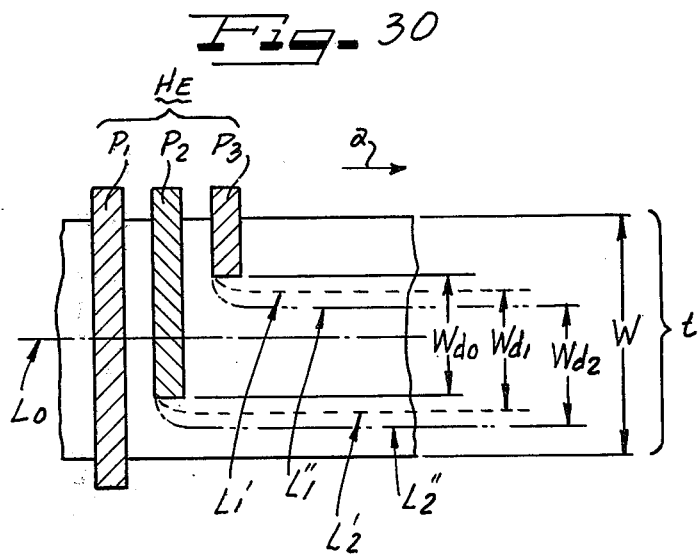
FIGS. 30, 31 and 32 are illustrations of modified dispositions of magnetic poles according to the invention.

The embodiment shown in FIG. 30 can be used to overcome the problem when different tapes of various coercive force values are used. The erasing head $H_E$ includes a first magnetic pole $P_1$ which engages the recording track $t$ over its entire width. The second magnetic pole $P_2$ having a polarity opposite to that of $P_1$ and a third magnetic pole $P_3$ of polarity the same as that of magnetic pole $P_1$ are arranged in sequence. The magnetic field of pole $P_2$ and $P_3$ must be greater than the greatest coercive force among the various magnetic tapes to be used. As shown in FIG. 30, the boundaries made by $P_2$ on the recording tracks with the various magnetic tapes were $L_2$ and $L_2$, respectively, and the boundaries made by the pole $P_3$ on the recording track with two tapes were $L_1$ and $L_1$ respectively. The symbol $W_{d1}$ and $W_{d2}$ are the widths of the track between $L_1$ and $L_2$, and $L_1$ and $L_2$, respectively. In order to decrease the distortion of all magnetic tapes of various coercive forces, the distances must be fixed such that $$W_{d0} = W_{d1} = W_{d2} = \frac{W}{2}.$$

Figure 31:
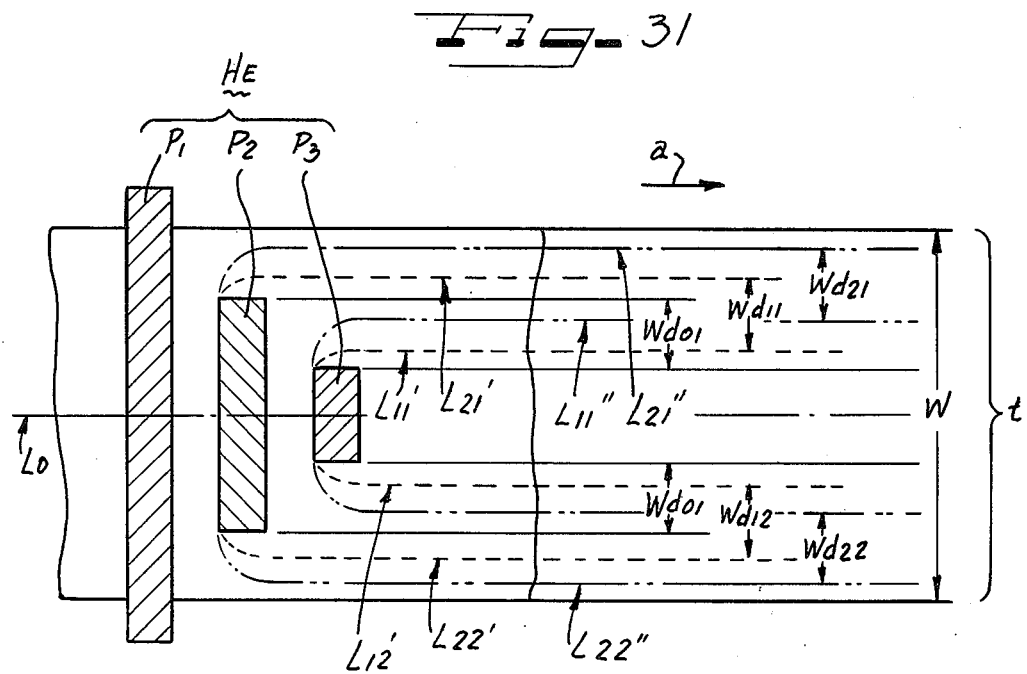

A modified form of the erasing head of FIG. 30 is shown in FIG. 31. With the polarities of $P_1$, $P_2$, and $P_3$ the same as those of FIG. 30, the relationships of the distances between boundaries are $$W_{d01} + W_{d02} = W_{d11} + W_{d12} = W_{d21} + W_{d22} = \frac{W}{2}.$$

Figure 32:
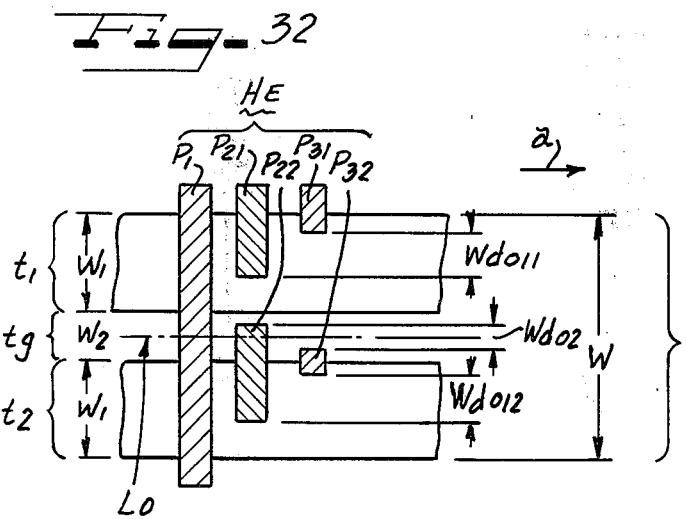

FIG. 32 illustrates an erasing head usable for both single and double track recording. This erasing head $H_E$ is essentially the combination of the head of FIG. 30 with the head of FIG. 22 or FIG. 25. The magnetic polarity of the second magnetic poles $P_{21}$ and $P_{22}$ is opposite to that of magnetic pole $P_1$, and the magnetic polarity of the third magnetic poles $P_{31}$ and $P_{32}$ is the same as that of the magnetic pole $P_1$. In this case, $W_{d011}..W_1/2$. $W_{d012}..W_1/2$, and $W_{d03}..W_2/2$, where $W_1$ is the width of track $t_1$ or $t_2$ and $W_2$ is the width of the guard band $t_g$.

FIGS. 33 to 36 show further examples of magnetic poles disposed relative to the recording track $t$ having a width $W$. The dotted line $L_0$ represents the center of the track $t$, and the magnetic tape is scanned from left to right along the direction of the line $L_0$.

In FIG. 33, three magnetic tapes are disposed against the magnetic track $t$. The first and third poles, $P_1$ and $P_3$ are north poles and the second pole $P_2$ is the south pole. The first and third poles, $P_1$ and $P_3$ extend from both edges of the track $t$ toward the inner portions of the track, respectively. The second pole $P_2$ is disposed almost at the center of the track $t$ and has a length $W_1$ running along the perpendicular to the line $L_0$. The length $W_1$ of the second pole $P_2$ is made smaller than the width $W$ of the track $t$. The locus of the tape area magnetized by the second pole $P_2$ is determined by the length $W_1$ in this embodiment. Preferably, $W_1$ is equal to one-half of $W$.

The inner edges of the first and third poles $P_1$ and $P_3$ are closer to the centerline $L_0$ than the outer edges of the second pole $P_2$. The edges of the poles $P_1$ and $P_3$ extend beyond the track width $W$. The magnitude of the three magnetic poles is sufficiently strong to magnetize the tape up to its saturated state.

FIG. 34 illustrates another magnetic tape pattern. The difference between this embodiment and that of FIG. 33 is the disposition of the third pole $P_3$ which is now disposed at the right of both the first pole $P_1$ and the second pole $P_2$. In this embodiment, the locus of the area magnetized by the pole $P_2$ becomes the area or zone between the lines $L_1$ and $L_2$. The line $L_1$ is defined by the upper edge of the second pole $P_2$, and the line $L_2$ is defined by the upper edge of the third pole $P_3$. The width $W_1$ is defined by the upper edge of the second and third poles and is chosen to be approximately half of the track width $W_1$.

FIG. 35 shows a third embodiment in which the first pole $P_1$ and the third pole $P_3$ are disposed at angles with respect to the second pole $P_2$.

than 36 shows another embodiment where three magnetic poles, $P_1$, $P_2$ and $P_3$ are arranged in parallal to each other and are inclined to the direction perpendicular to the centerline $L_0$.

FIG. 37 shows another embodiment where a second pole $P_2$ is inclined to the respect tothe other two poles. The total dimension of the poles can be made smaller than that of the embodiment of FIG. 34. When the inclined arrangements are used as shown.

It should be evident that various modifications can be made to the described embodiments without departing from the scope of the present invention.

We claim as our invention:

1. A magnetic erasing head comprising at least two magnetic poles arranged to contact a track of a traveling magnetic recording medium, the first of said poles having one magnetic polarity and engaging substantially the full width of said track, and the second of said poles being of lesser width than said first pole and engaging less than full width of said track and being of opposite polarity, said first pole providing a magnetic field sufficient to magnetize said track to saturation, and the second of said poles providing a magnetic field greater than the coercive force of said mgnetic recording medium.

2. An erasing head according to claim 1 in which said first pole engages at least the full width of said track and said second pole engages approximately one-half the width of said track.

3. An erasing head according to claim 2 in which one edge of both said poles extends beyond a lateral edge of said medium.

4. An erasing head according to claim 1 which further includes a third pole, said three poles being spaced prallel in the direction of travel of said medium with said second pole between said first and third poles, said three poles being of progressively decreasing width, said third pole being of the same polarity as said first pole providing a magnetic field greater than the coercive force of said magnetic recording medium.

5. An erasing head according to claim 1 in which said poles are formed of bar-type magnets ebedded in parallel relation in a head block.

6. An erasing head according to claim 1 in which said poles consist of magnetized areas along a magnetizable head block.

7. An erasing head according to claim 1, said poles comprisng a ring core having two opposed pole pieces, a center leg having one end disposed between said two pole pieces and the other end connected to said ring core, said two pole pieces and said one end forming two gaps which provide said poles a winding about said center leg and means for energizing said winding with a direct current.

8. An erasing head according to claim 1 in which said second pole provides a magnetic field of an intensity at least 1.5 times the coercive force of said magnetic medium.

* * * * *